United States Patent [19]

Smith, Jr. et al.

[11] 4,450,354
[45] May 22, 1984

[54] GAIN STABILIZED NATURAL GAMMA RAY DETECTION OF CASING THICKNESS IN A BOREHOLE

[75] Inventors: Harry D. Smith, Jr.; Carl A. Robbins, both of Houston, Tex.

[73] Assignee: Halliburton Company, Duncan, Okla.

[21] Appl. No.: 483,400

[22] Filed: Apr. 8, 1983

Related U.S. Application Data

[63] Continuation-in-part of Ser. No. 395,517, Jul. 6, 1982.

[51] Int. Cl.³ ............... G01V 5/00; G01T 1/20
[52] U.S. Cl. ..................... 250/256; 250/361 R; 250/369
[58] Field of Search ........... 250/256, 264, 265, 262, 250/361 R, 367, 369

[56] References Cited

U.S. PATENT DOCUMENTS

| | | | |
|---|---|---|---|
| 2,881,324 | 4/1959 | Scherbatskoy | 250/264 |
| 4,048,495 | 9/1977 | Ellis | 250/264 |
| 4,129,777 | 12/1978 | Wahl et al. | 250/264 |

Primary Examiner—Janice A. Howell
Attorney, Agent, or Firm—W. J. Beard

[57] ABSTRACT

A gain stabilized natural gamma ray spectroscopy system is used to measure casing thickness in a cased well borehole. A ratio of gamma ray intensity in two selected energy ranges forms a measurement signal representative of casing thickness based on the photoelectric absorption of natural gamma rays by iron. A coincidence technique employing dual scintillation crystals and a stabilization source of charged particles and known energy gamma rays is used for gain stabilization.

24 Claims, 5 Drawing Figures

GAIN STABILIZED NATURAL GAMMA RAY DETECTION OF CASING THICKNESS IN A BOREHOLE

This application is a continuation-in-part of copending application Ser. No. 395,517 filed July 6, 1982.

FIELD OF THE INVENTION

The present invention is concerned generally with detecting naturally occurring gamma radiation from earth formations penetrated by a well borehole having a casing placed therein. This invention is concerned with measuring thickness, or equivalently, weight per unit length, of the casing. More specifically, the invention concerns methods and apparatus for detecting natural gamma radiation by measuring the count rate in specified energy ranges. The energy ranges are defined dependent on the photoelectric absorption by iron across the defined spectral ranges. The detected, naturally emitted gamma rays are summed and a ratio is obtained to indicate casing thickness, which can vary due to corrosion or wear. The technique also locates collars, perforations and other variations in casing thickness or weight. A novel gain stabilization technique utilizing coincidence-anticoincidence detection insures linearization of the gamma ray spectra detected in the invention.

BACKGROUND OF THE INVENTION

In recent years, gamma ray spectroscopy of earth formations adjacent to a well borehole has been enhanced by highly stable scintillation detectors. Such detectors are normally mounted in a sonde which is lowered in a well borehole. They produce a pulse height spectrum proportion to the gamma ray energy spectrum of the gamma rays impinging on the scintillation crystal. The gain stabilized scintillation detector of the present invention utilizes the naturally occurring gamma radiation emitted from earth formations. The gamma radiation is produced primarily by potassium, uranium and thorium (and/or their daughter decay products).

Naturally occurring gamma radiation is emitted isotropically from unstable nuclides in earth formations whereupon it is transmitted through the formation and borehole materials to impinge on a scintillation crystal in the well borehole. Photoelectric absorption, Compton scattering, and pair production attenuate the radiation between its source generation in the formation and its detection in the crystal. The crust of the earth is a layered medium composed, in large part, of silicon, hydrogen, carbon, calcium, chlorine, oxygen and other relatively low atomic weight elements. The same elements are principally present in cement, mud, and borehole water or oil between the formation and detector. The iron in well casing has a higher atomic number than virtually all of these other elements, and also attenuates the naturally occurring gamma radiation prior to its being detected. However, significant photoelectric absorption in iron takes place at a higher energy level than in these other elements, and hence one can effectively isolate the attenuation due to iron from that due to other elements by using an energy dependent measurement of this photoelectric attenuation. This data, if properly normalized, can provide a measurement of the amount of iron (and hence casing thickness) which is present in a well.

Virtually all producing wells are cased. At the time that a well is cased, the casing program may be readily available whereby nominal casing thickness can be determined. However, many wells, due to changes in formation pressures as a function of depth, require several strings of different size casing to be incorporated into the drilling program. In drilling out below a depth to which casing has been set, it is possible that the casing may wear due to contact with the drill string used to drill out the deeper section in the well. This wear results in a decrease in casing thickness, which in turn weakens the casing. In many other instances, casing of a known thickness was installed in a well. However, after years of exposure to external deterioration caused by formation fluids, and internal deterioration due to produced fluids, corrosion may very well reduce the thickness, and hence strength, of the casing. In order to avoid casing collapse or blowouts, it is necessary to know the degree of wear or corrosion which has taken place, and to take remedial action if sufficient reduction in casing thickness has taken place. For these reasons, it is extremely valuable to be able to determine the thickness of the casing.

Photoelectric absorption is a gamma ray attenuation process whereby the gamma ray is completely removed in the interaction. The cross section, or probability, of photoelectric absorption ($\sigma$) is strongly affected by the energy E of the gamma ray and the atomic number, Z, of the element with which it interacts. This relationship is approximated by:

$$\sigma \sim Z^{4.6}/E^3 \qquad (1)$$

Since iron has a higher Z (=26) than most earth formation elements, below a given energy level (about 175 KeV), iron dominates this absorption process. Above about 200 KeV, photoelectric absorption in iron, as well as other principal downhole elements is not significant. Hence if iron is present in the formation or borehole in vicinity of the logging tool detector, then the count rate in the detector in the tool at energies below about 175 KeV is decreased relative to the count rate in a higher energy range in which range photoelectric absorption is not significant. In addition, since iron has a higher Z than other elements in cement and borehole fluids, this relative attenuation increase in the lower energy range is virtually independent of changes in borehole geometry and composition. Changes in these variables will similarly influence count rates both below and above 175 KeV, as will changes in the density and lithology type of the formations from which the gamma rays are originally emitted. Of course, the concentration of radioactive source materials in the formation will also be similarly reflected both above and below 175 KeV.

Since casing thickness changes produce a pronounced relative count rate change (more than the other variations described above) in the very low energy region of the detected natural gamma spectrum, it is possible to isolate the effects of photoelectric absorption in iron. A ratio comparison of the summed counts in two energy ranges, one of which is sensitive to photoelectric absorption in iron, and (a higher) one in which photoelectric absorption in iron is negligible, is sensitive to changes in iron thickness, but not to changes in other downhole parameters. This ratio, when compensated for the geometrical differences between casings of different sizes, can be used to directly indicate the thickness of the casing in the borehole. The above described energy range measurements require a highly stable scintillation detection system. In the present invention a coincidence technique is used to gain stabilize the detector to a precise degree.

BRIEF SUMMARY OF THE PRESENT DISCLOSURE

This disclosure sets forth a gain stabilized method and apparatus for determining casing thickness. Through the use of a sensitive gain stabilized NaI(Tl) scintillation detector and pulse height analyzer connected to the detector, gamma ray photons arrive at the detectors in two energy bands, typically one being a low energy range of about 35 to about 120 KeV. The other is about 180–325 KeV, with the upper limit selected to minimize the difference between changes in the source type in the formation. The two ranges are on opposite sides of an inflection point occurring at about 150–175 KeV which is the threshold energy for significant photoelectric absorption in iron. As the ratio varies, it indicates a variation in casing thickness dependent on suitable scale and geometric factors employed. The procedures also detects casing collars and perforations in the casing. A second, smaller scintillation detector employing an Americium 241 seeded CaF(Eu) detector scintillation crystal coupled to its photomultiplier is used in coincidence anti-coincidence with the NaI(TL) scintillator to gain stabilize the primary scintillator detection system.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE PREFERRED AND ILLUSTRATED EMBODIMENT

Figures 1, 2:
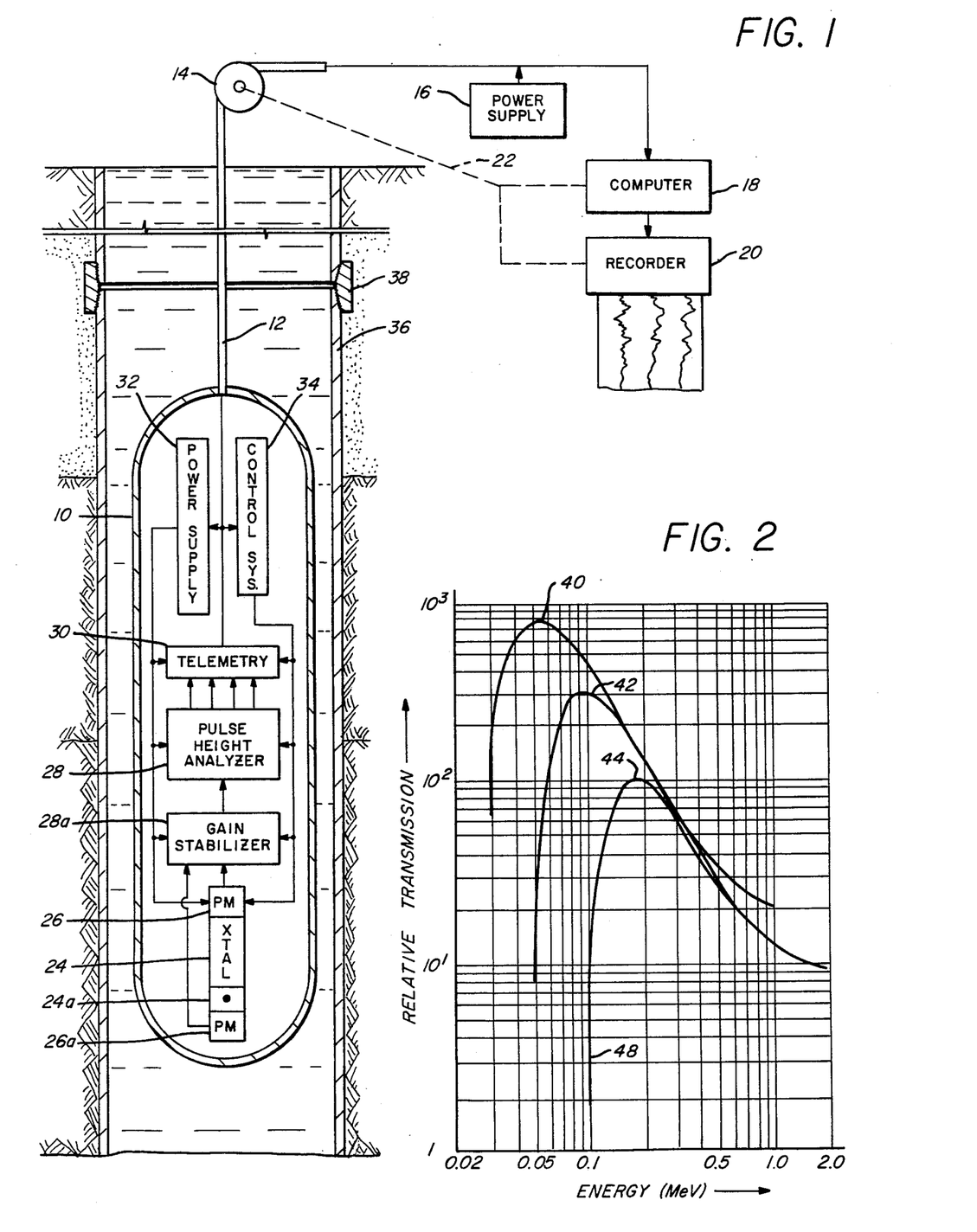
FIG. 1 is a schematic sectional view of a sonde in a well borehole penetrating earth formations and incorporating a gain stabilized scintillation detector responsive to naturally occurring gamma radiation from the earth's formations.
FIG. 2 shows three spectra of scattered gamma rays for oxygen, silicon and iron as a function of the energy level of the gamma ray photons.

Attention is first detected to FIG. 1 of the drawings. A sonde 10 is suspended on a conventional multiconductor or single conductor armored well logging cable 12. The logging cable 12 extends to the surface and passes over a sheave wheel 14. The cable supports one or more conductors including a power supply system connected with a surface located power source 16. The logging cable 12 has conductors which are electrically coupled to a computer 18. The computer is connected to a recorder 20. In addition, the recorder 20 is mechanically or electrically connected with a sheave wheel 14 at 22 to transfer depth measurements of the sonde. The sonde 10 is lowered to the bottom of the well and a typical logging run progresses as the sonde, suspended on the logging cable is raised from the well. As it is raised, the depth information is transmitted from the sheave wheel 14 to the recorder. This enables data to be recorded on some suitable record as a function of depth in the wellbore.

The sonde 10 supports the logging apparatus of this disclosure. That apparatus includes a main scintillation crystal 24 and a secondary scintillation crystal 24a. As an example, one suitable main scintillation crystal is manufactured by Harshaw Chemical Company and is a NaI(TL) (Thallium activated) crystal. It is connected to a photomultiplier 26, a suitable model being an EMR 543 photomultiplier. The secondary scintillation crystal is much smaller and may be, typically, a thin CaF(Eu) which is attached to a secondary photomultiplier 26a and which will be described in more detail subsequently with respect to FIG. 5. The main photomultiplier 26 forms electrical signals which are input to a gain stabilizer circuit 28a and to a pulse height analyzer 28. Pulse height analyzer 28 is connected with telemetry apparatus 30. The sonde also includes a power supply 32 and a suitable electronic control system 34. The sonde equipment is connected through the logging cable 12 to the surface equipment previously described. In ordinary operation, the sonde is decentralized (centralized operation is also feasible) in the borehole as it is pulled toward the surface. The sonde housing 43 could be composed of steel or titanium, but preferentially a material, such as a graphite fiber reinforced epoxy, which minimally attenuates low energy gamma rays is used in the area immediately around the main scintillation detector crystal 24.

The sonde 10 is lowered into a cased wellbore. The casing 36 supports occasional collars at the end of each joint of the casing, and one such collar is indicated at 38. The casing 36 may be very uniform in thickness, or it may be corroded or worn, either externally or internally, and thereby reduced in thickness. Also, perforations may be formed in the casing.

Referring now to FIG. 2 of the drawings, this graph shows the relative attenuation characteristics per unit mass oxygen, silicon and iron to incident gamma radiation as a function of gamma ray energy. FIG. 2 is from "Energy Distribution of Scattered Gamma Rays in Natural Gamma Logging" by J. A. Czubek and A. Lenda, IAEA Nuclear Techniques & Minerals Resources Transactions, Buenos Aires, Argentina, 1968. FIG. 2 depicts the relative transmission spectra through the three elements. It assumes a gamma ray source within a homogeneous medium of the indicated material of infinite dimension, and the source is presumed to have the same strength in all spectra. The curve 40 is the relative transmission of oxygen (Z=8). Oxygen is more transparent to low energy gamma rays, providing less attenuation than the other two elements. The curve 42 is the relative gamma ray transmission of silicon (Z=14). The curve 44 sets out the gamma ray transmission characteristics of iron (Z=26). At higher energy levels, the three curves show similar relative attenuation characteristics. This indicates that gamma radiation from the earth formations are attenuated per unit mass more or less similarly by all three elements, which is a characteristic of Compton scattering, the dominant attenuation cross section in this energy range for these elements. Because of this similar relative attenuation at higher energies, the spectral shape of gamma rays reaching the detector will be virtually unaffected by changes in casing conditions, or changes in other downhole parameters. Of course, the absolute magnitudes of the count rates in these higher energy ranges will be altered by changes in borehole conditions, as well as to changes in the intensity of the gamma source in the formation.

Below about 200 KeV, the relative transmission curve of iron decreases sharply to the curved portion 48. This response indicates quite high attenuation for iron to low energy photons. This is especially true in the range from 35 to 120 KeV. Casing in the well borehole will thus effectively prevent low energy photons from arriving at the scintillation crystal 24.

Figure 3:
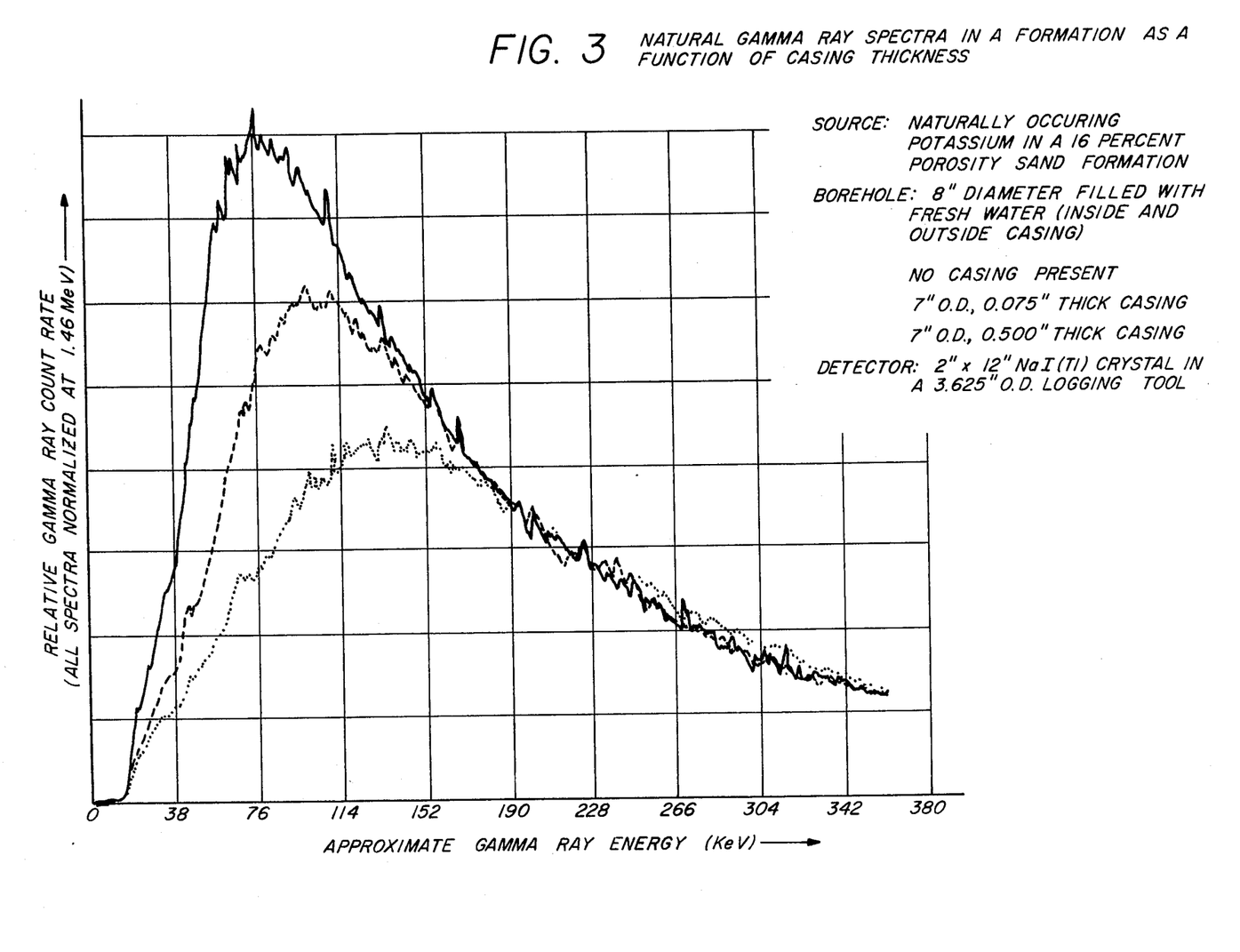
FIG. 3 shows spectra recorded in a potassium rich sand formation for three different thicknesses of 7" O.D. casing present in the borehole, as measured in a 2"×12" NaI detector in a natural gamma ray logging tool.

FIG. 3 shows the detected gamma ray count rates as a function of energy for varying casing thickness in the same well borehole and formation. The three spectra were recorded in an 8" borehole surrounded by a 16% porosity sand formation containing a uniformly distributed potassium source, typical of the type and intensity of sources found in downhole formations. In all three spectra, the count rates were normalized in the unscattered potassium energy range at 1.46 MeV. The solid curve, is the spectrum recorded without casing present (0" thickness), the dashed curve for a 7" casing with 0.075" wall thickness, and the dotted curve for a 7" casing with 0.50" wall thickness. The ordinate is the observed detector count rate (arbitrary full scale value) in each of these borehole environments. The abscissa is the energy level of the impinging gamma ray photons. At the energy level of about 20 KeV, attenuation by the casing is substantially total. Between 20 KeV and 175 KeV, very significant differences in the three spectra indicate the effects of changing casing thickness. Above about 175-200 KeV the spectra have much more similar spectral shapes, with only minor differences due to the degree of Compton down scattering. This similar shape extends up to beyond the upper energy range shown in the graph (350 KeV) to the source energy level at 1.46 MeV. From FIG. 3 it can be seen that a ratio of count rates in each spectrum in a range below 175 KeV to the count rate in a range above 175 KeV is strongly affected by casing thickness.

Figure 4:
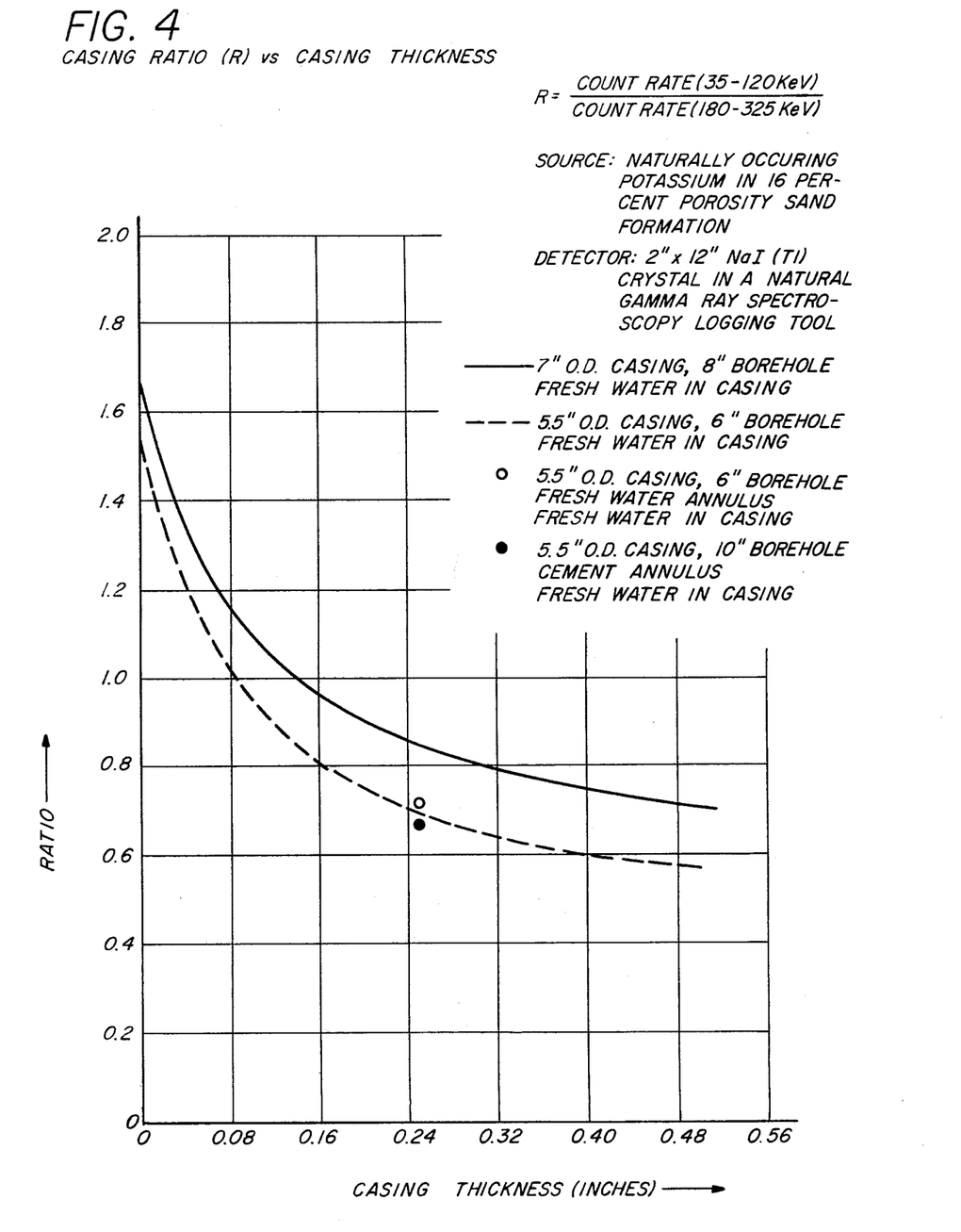
FIG. 4 is a graph of a natural gamma ray photoelectric absorption ratio determined in accordance with the present invention versus casing thickness, for both 7" and 5.5" casings.

FIG. 4 is a graph of casing thickness in inches versus a ratio of count rate in the energy range 35-120 KeV relative to that in the range 180-325 KeV, as measured in a 2"×12" NaI (TL) detector in a natural gamma ray spectroscopy well logging tool. The formation outside the borehole is a potassium rich 16% porosity sand formation. The upper curve was obtained for varying thickness of 7" O.D. water filled casing in an 8" diameter borehole; the lower curve is for varying thickness of a 5.5" O.D. water filled casing in a 6" diameter borehole. Also shown are data points for a 5.5" water filled casing in a 10" water filled borehole and in a 10" cement filled borehole. FIG. 4 illustrates a method in which nominal casing size is known, and actual casing thickness can be determined from the ratio curve. It also shows that changes in borehole conditions, for a given casing, have little effect on the observed ratio, and hence casing thickness calculation. For very accurate casing thickness determinations, however, it may be possible to improve slightly the resulting measurement by correcting the observed casing ratio for non-casing related borehole changes if these parameters, such as cement thickness and type, are known.

Assume, in actual logging operations that a sonde is lowered to the bottom of a well in the manner set forth in FIG. 1. At a borehole depth of interest, the equipment is operated to obtain from the borehole measurement system measurements from the naturally occurring gamma ray energy spectrum wherein the spectrum is divided into two energy response bands or windows. Suitable windows are exemplified above, and they are on opposite sides of approximately 175 KeV.

The scintillation detector is exposed to the gamma ray spectrum at the depth of interest for a specified interval. During this time, the counts in the two energy bands are summed, the ratio formed and then compared to a curve such as one of the curves in FIG. 4 to obtain a relative indication of casing thickness. It is particularly important to note that the count ratio in the two energy windows is considered, not the absolute count or count rate. Because the ratio is formed by measurements in both energy ranges from the same source of gamma rays, the source strength is normalized by taking the ratio. This normalization minimizes fluctuations from formation source strength, thickness of the cement (if any) around the casing, formation density, variations in lithology, changes in borehole fluid, dwell time of the tool at the particular depth, and leaves thickness of the casing as the primary variable. Slight changes in ratio may be observed due to changes in source type (potassium, uranium, or thorium), the magnitude of which may be related to the energy ranges selected for the ratio. If required, these changes can be normalized by using the calculated concentration of the three elements (or their daughter products) obtained simultaneously with the casing thickness ratio in the natural gamma spectroscopy tool.

Different ratio readings are taken as a function of depth in the well. As the sonde 10 is raised in the well, the thickness or weight of the casing can be obtained from the measured ratios, assuming the nominal casing diameter is known. The surface computer 18 (FIG. 1) is programmed to compute the casing thickness from the ratio and mathematical approximations to calibrated curves such as those in FIG. 4. Changes in the ratio indicate an externally or internally induced change in casing thickness. Assume that the sonde 10 is raised until it is adjacent a casing collar 38 shown in FIG. 1. The coupling reduces the low energy transmission and thereby alters the ratio. Assume that the casing has been placed in a well borehole for many years. When installed, it had a known thickness. However, it has been exposed to corrosion and is thereby thinned. The casing thickness monitor of this disclosure is especially useful in detecting weakened casing sections. Detection of perforations is also possible. Casing wear, resulting from drilling or workover operations, can also be detected. External, as well as internal, wear or corrosion is sensed with the measurement.

As shown in FIG. 1 of the drawings, a large or primary gamma scintillation crystal detector 24 is incorporated. It is not uncommon to use crystals as large as 2" by 12". The crystal 24 is indicated by the numeral 51 in FIG. 5 of the drawings immediately adjacent to a photomultiplier tube 52 which corresponds to 26 of FIG. 1. The photomultiplier 52 is powered by a photomultiplier high voltage supply 53. A control signal is input to this voltage supply from stabilizer circuit 54 via line 55. As the control signal on line 55 is changed, the amplification factor of the photomultiplier tube 52 is also changed. The large scintillation crystal detector 51 is positioned immediately adjacent to an optically opaque thin screen or housing 56. The housing 56 is constructed to prevent detector scintillation light flashes from passing through the screen and impinging on the second small crystal detector 57 and vice versa. A relatively small scintillation crystal detector 57 is located immediately adjacent to the primary crystal detector 51. Secondary detector crystal 57 can be formed of the same material, or preferably a low atomic number material to reduce the possibility of photoelectric absorption in crystal 57 of gamma rays from source 58. One such alternative material is Europium doped calcium fluoride CaF (Eu). Other types and sizes of scintillation crystal detector material can be used, provided the stabilizer gamma ray can escape the small crystal with minimum attenuation, while the charged particle is detected with a high degree of efficiency.

Figure 5:
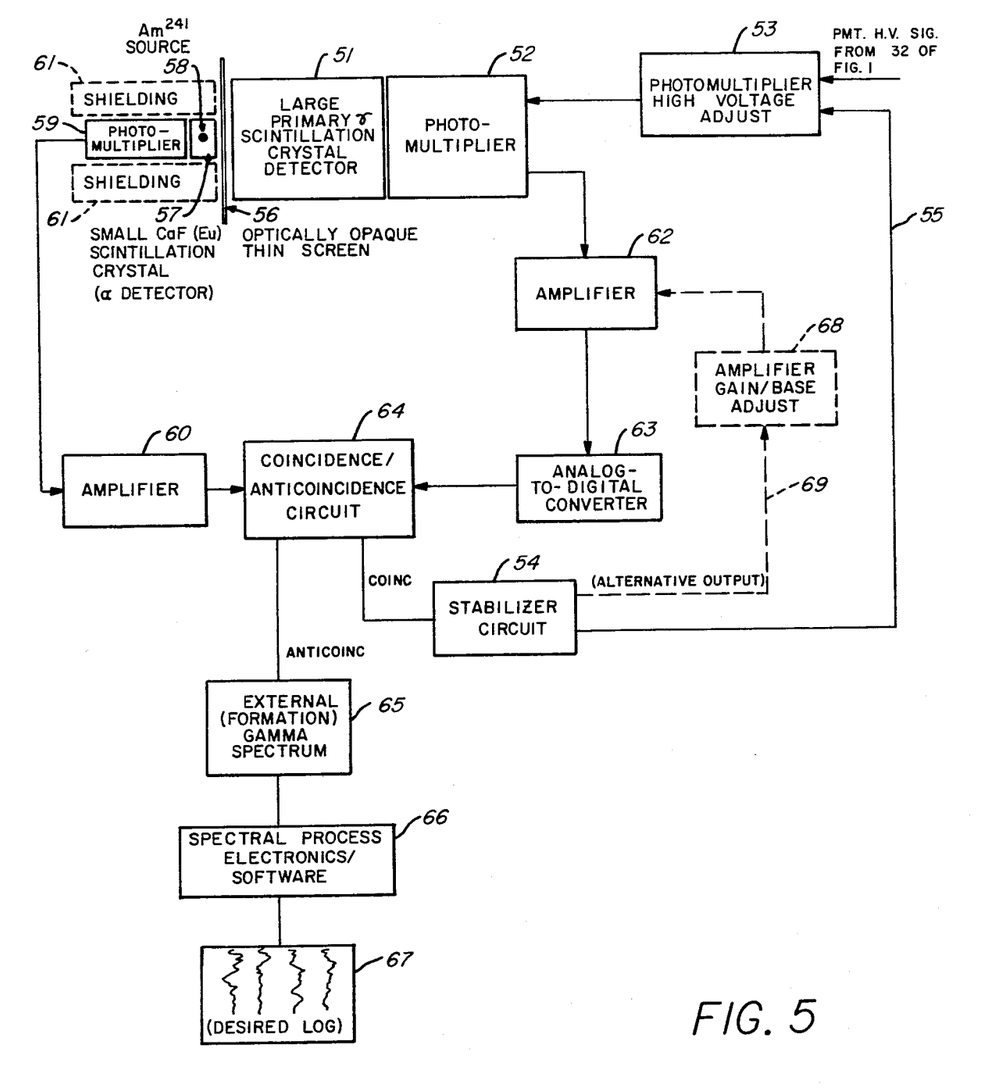
FIG. 5 is a schematic block diagram illustrating in more detail the gain stabilization technique used in the system of the present invention.

A small radiation source 58 is embedded in the secondary scintillation crystal detector 57. The source is preferably a low intensity radiation source which emits a charged particle and a more or less simultaneous photon of gamma radiation. Either an alpha or beta particle will suffice, however alpha particles are easier to detect, and hence alpha emitting sources may be preferable. A suitable preferred source is Americium 241. The emitted charged particle is detected by the secondary crystal detector 57. The charged particle is emitted at about the same instant in time as a gamma photon of a known energy level. Using the radiation source mentioned above as the preferred source, there is an alpha particle of about 5.5 MeV energy first emitted. It is followed by emission of a 60 KeV gamma photon. The timing between the two is approximately 63 nanoseconds. This is so close that it is simultaneous emission for practical purposes in a well logging tool containing microsecond electronics. When the charged particle is emitted, it is detected by the smaller crystal detector 57. The crystal detector 57 emits a light flash which is observed by a secondary photomultiplier tube 59. This forms a voltage pulse signal which is applied to an amplifier 60 for amplification and pulse shaping. Amplifier 60 output pulse is the first of two signals for which coincidence will be tested as described hereinbelow.

If the source 58 is surrounded by a properly designed crystal detector 57 with dimensions significantly larger than the stopping distance of the charged particle emitted, this assures that the charged particle will be detected with almost 100% efficiency. Since gamma rays are much more penetrating than charged particles, the detector 57 can also be designed small enough so that very few gammas are detected. If the gamma ray has low energy, it may be desirable that detector 57 be fabricated of a low atomic number material to minimize photoelectric absorption in detector 57. A shield 61 may also be incorporated to surround a substantial portion of the detector crystal 57, thereby improving the possibility that the gamma photon will be directed from the source embedded in the small detector crystal 57 into the main scintillation crystal detector 51. The shield 61 also serves to isolate the crystal 57 from any external photons or particles which might otherwise impinge on it. Moreover, the gamma ray photon passes through the relatively thin optically opaque screen 56 into the primary crystal detector 51. Photomultiplier 52 output is amplified in an amplifier 62 and supplied to an analog to digital converter 63. Due to geometrical constraints some, but not all, of the gamma photons from source 58 are detected in the main crystal 51 and digitized in this manner. These digital outputs together with outputs from crystal 51 due to all other gamma ray sources are the second of the two events for which coincidence will be tested. The charged particle is observed by the photomultiplier tube 59 while the gamma photons are observed by the crystal detector 51 and photomultiplier 52. When the coincidence circuit 64 detects a gamma ray event and an alpha particle event simultaneously, the gamma ray is virtually always one which originated in source 58, and hence has a known, fixed energy. Hence the coincidence output signal observed from this photon from primary detector crystal 51 and photomultiplier 52 should be fixed. Should the output signal observed in stabilizer circuit 54 associated with this photon vary, changes can be made in the control signal from stabilizer circuit 54 to thereby assure that the gain of photomultiplier 52, amplifier 62 and other associated circuits will be consistent. Since the coincidence stabilization gamma ray pulses processed in circuit 54 are isolated from the variable background from other gamma rays measured in detector 51, the gain stabilization achievable is much improved.

The coincidence circuit 64 circuit has two inputs. One is the pulse associated with the charged particle in detector 57, and the other is the gamma ray pulses observed by the photomultiplier tube 52 and primary detector crystal 51. Utilizing the radiation source mentioned above, the two pulses are substantially simultaneous for coincidence purposes. Accordingly, the pulse from the amplifier 60 enables the coincidence circuit 64 to determine coincidence. If coincidence is observed, this is indicated by forming an output signal for the stabilizer circuit 54. The circuit 54 in turn forms a control signal on line 55 for the photomultiplier high voltage supply 53 to increase or decrease the voltage supplied to the primary detector photomultiplier 52. If the stabilizer circuit 54 observes that coincidence has occurred, it then evaluates the amplitude of the digitized signal associated with the detected photon.

If this amplitude matches a predetermined known energy level, no change is made. Otherwise, control feedback is provided to the high voltage supply 53 to change the gain of the system and thereby bring the pulse amplitude to the required value.

The anti-coincidence spectrum in analyzer 65 contains all gamma rays incident on and detected by the main crystal 51 except those from the stabilizer source 58. Since the stabilizer gammas could otherwise provide an undesirable interference component in the spectrum, the anticoincidence spectrum is much improved. This is especially true if the stabilizer gamma from source 58 is present in an energy range which is also of interest for analysis of gammas from the formation. In the natural gamma spectroscopy tool described herein, and especially the measurement of casing thickness, the 60 KeV stabilizer gamma if not anti-coincidenced would fall directly into the lower energy range of the casing ratio measurement. In natural gamma spectroscopy, since formation gammas span the entire energy range of common stabilizer isotopes, there is also no other energy (high or low) where a conventional stabilizer peak could be placed and not have it interfere with the desired formation spectrum. Thus the anticoincidence feature which removes the stabilizer gammas from the remaining spectrum 65 is highly desirable.

Consider one example of operation. Assume that the 60 KeV photon pulse is digitized and has an amplitude of 60 arbitrary units. If the stabilizer circuit is provided with a signal from the circuit 64 indicating that coincidence has occurred, the input signal is then tested to assure that it measures 60 units. If it does, no change is made. If it does not, a change is made and is implemented by altering the control signal on line 55 to the high voltage supply adjust 53. This then assures that the digitized pulse height from the analog to digital converter 63 remains gain stabilized when it is input to the pulse height analyzer 65 (denoted as 28 in FIG. 1.). It is output to the telemetry circuit 30 (FIG. 1) which provides the proper signals to the surface for further signal processing as before described.

Upon occurrence of an anticoincidence in the coincidence detection circuit 64, the digitized signal from the ADC 63 is part of the external or formation originating gamma ray spectrum as accumulated in the analyzer indicated by block 65 of FIG. 5. As indicated at block 66 this data is processed as hereinbefore described to extract casing thickness and other information and recorded in log form as indicated at block 67.

As a possible alternative arrangement as shown by dotted line 69 and dotted box 68 in FIG. 5, rather than adjusting the high voltage supply 53 to photomultiplier tube 52 to control gain, the feed back control signal could be processed by an amplifier Gain/Base adjust circuit 68 and applied to the photomultiplier amplifier 62 to stabilize the gain and/or baseline of the system. A pure gain adjustment employs the same principles enunciated previously. A gain plus baseline adjustment can be very effective if the coincidence stabilization spectrum contains two energy peaks instead of one. Since the $Am^{241}$ coincidence spectrum using an NaI crystal 51 contains a 31 KeV I K-xray escape peak as well as the 60 KeV gamma ray, both baseline and gain stabilization can be achieved simultaneously, if desired, using well known technology.

While the foregoing is directed to the preferred embodiment, the scope thereof is determined by the claims which are attached below.

We claim:

1. A method of gamma ray spectral logging of a well borehole to determine the casing thickness of a cased well borehole, substantially independently of borehole conditions, comprising the steps of:

(a) measuring by detection in a gain stabilized energy responsive detection system in a logging tool the energy spectrum of gamma rays from outside a casing in the vicinity of a well borehole said gamma ray spectrum being divided into gamma ray intensities measured in two energy bands and wherein said gain stabilization is accomplished by use of a reference gamma ray energy emitter which coincidently emits a charged particle, and (b) combining the gamma ray count rate data in one energy band in which photoelectric absorption in iron is significant with the gamma ray count rate data in one energy band where photoelectric absorption in iron is not significant to form an output signal indicative of casing thickness.

2. The method of claim 1 and further including repeating the steps at different depths in a cased borehole and recording said casing thickness indicative signal as a function of borehole depth.

3. The method of claim 1 wherein the two energy bands are respectively above and below a level at which photoelectric absorption per unit mass in iron and silicon become approximately equal for increasing energy levels.

4. The method of claim 1 wherein the two energy bands are primarily respectively above and below approximately 175 KeV.

5. The method of claim 4 wherein one energy band encompasses the range 35–120 KeV and the other band encompasses the range 180–325 KeV.

6. The method of claim 1 wherein said combining step includes forming a ratio of count rates in the two energy bands.

7. The method of claim 1 including the step of locating casing collars along the borehole as a function of casing thickness.

8. The method of claim 1 including the step of locating perforations along the casing in the borehole as a function of casing thickness.

9. A gain stabilization system for an energy responsive gamma ray detection system for borehole use, comprising:

a first scintillation crystal optically coupled to a first photomultiplier having an adjustable voltage power supply responsive to a gain control signal and capable of producing output pulses representative of the energy of gamma rays incident on said first scintillation crystal;

a second scintillation crystal optically coupled to a second photomultiplier capable of producing output pulses and located in close physical proximity to said first scintillation crystal, but optically separated therefrom;

a radiation source capable of substantially simultaneously emitting a charged particle and a gamma ray photon having a known energy, said source being in close proximity to said second scintillation crystal, said second scintillation crystal being capable of detecting such charged particles but said second scintillation crystal being sized to be substantially transparent to said known energy gamma ray photons, and said second photomultiplier producing output pulses representative of said charged particles substantially in time coincidence with the emission of such known energy gamma ray photons;

coincidence and anti-coincidence detection means for detecting the presence of an output pulse from said first and second photmultipliers and for producing a coincidence output signal upon the occurrence of such a coincidence; and means responsive to said coincidence output signal and connected to said adjustable voltage power supply for producing said gain control signal as a function of the output pulses from said first photomultiplier caused by said known energy photons.

10. The apparatus of claim 9 and further including gamma ray shielding means disposed about said second scintillation crystal to lower the response of said crystal to external gamma rays but shaped to permit passage from said second scintillation crystal to said first scintillation crystal of said known energy gamma ray photons.

11. The apparatus of claim 9 wherein said charged particle emitted by said radiation source comprises an alpha particle.

12. The apparatus of claim 11 wherein said radiation source is $Am^{241}$.

13. The apparatus of claim 12 wherein said source is substantially surrounded by said second scintillation crystal.

14. The apparatus of claim 13 wherein said first scintillation crystal comprises a thallium doped sodium iodide crystal.

15. The apparatus of claim 13 wherein said second scintillation crystal comprises a material which does not significantly photoelectrically attenuate said known energy gamma rays.

16. The apparatus of claim 15 wherein said second scintillation crystal comprises a europium doped calcium fluoride crystal.

17. A gain stabilization system for an energy responsive gamma ray detection system for borehole use, comprising:
   a first scintillation crystal optically coupled to a first photomultiplier capable of producing output pulses representative of the energy of gamma rays incident on and x-rays generated within said first scintillation crystal;
   amplifier means responsive to a gain control signal for amplifying the output of said first photomultiplier and having a variable gain and baseline responsive to said gain control signal;
   a second scintillation crystal optically coupled to a second photomultiplier capable of producing output pulses and located in close physical proximity to said first scintillation crystal, but optically separated therefrom;
   a radiation source capable of substantially simultaneously emitting a charged particle and a gamma ray photon having a known energy, said source being in close proximity to said second scintillation crystal, said second scintillation crystal being capable of detecting such charged particles but said second scintillation crystal being sized to be substantially transparent to said known energy gamma ray photons, and said second photomultiplier producing output pulses representative of said charged particles substantially in time coincidence with the emission of such known energy gamma ray photons;
   coincidence and anti-coincidence detection means for detecting the presence of an output pulse from said first and second photomultipliers and for producing a coincidence output signal upon the occurrence of such a coincidence; and
   means responsive to said coincidence output signal and connected to said amplifier means for producing said gain control signal as a function of the output pulses from said amplifier means caused by said known energy x-ray and gamma ray photons.

18. The apparatus of claim 17 and further including gamma ray shielding means disposed about said second scintillation crystal to lower the response of said crystal to external gamma rays but shaped to permit passage from said second scintillation crystal to said first scintillation crystal of said known energy gamma ray photons.

19. The apparatus of claim 17 wherein said charged particle emitted by said radiation source comprises an alpha particle.

20. The apparatus of claim 19 wherein said radiation source is $Am^{241}$.

21. The apparatus of claim 20 wherein said source is substantially surrounded by said second scintillation crystal.

22. The apparatus of claim 21 wherein said first scintillation crystal comprises a thallium doped sodium iodide crystal.

23. The apparatus of claim 21 wherein said second scintillation crystal comprises a material which does not significantly photoelectrically attenuate said known energy gamma rays.

24. The apparatus of claim 23 wherein said second scintillation crystal comprises a europium doped calcium fluoride crystal.

* * * * *